United States Patent
Trolez et al.

(10) Patent No.: US 11,523,156 B2
(45) Date of Patent: Dec. 6, 2022

(54) METHOD AND SYSTEM FOR DISTRIBUTING AN AUDIOVISUAL CONTENT

(71) Applicant: QUORTEX, Cesson-Sevigne (FR)

(72) Inventors: Thierry Trolez, Cesson-Sevigne (FR); Marc Baillavoine, Cesson-Sevigne (FR); Julien Villeret, Cesson-Sevigne (FR); Jérôme Vieron, Cesson-Sevigne (FR)

(73) Assignee: QUORTEX, Cesson-Sevigne (FR)

( * ) Notice: Subject to any disclaimer, the term of this patent is extended or adjusted under 35 U.S.C. 154(b) by 0 days.

(21) Appl. No.: 16/723,238

(22) Filed: Dec. 20, 2019

(65) Prior Publication Data
US 2020/0213641 A1 Jul. 2, 2020

(30) Foreign Application Priority Data
Dec. 27, 2018 (FR) ...................................... 1874204

(51) Int. Cl.
*H04N 21/258* (2011.01)
*H04N 21/239* (2011.01)
(Continued)

(52) U.S. Cl.
CPC ......... *H04N 21/2393* (2013.01); *H04L 65/80* (2013.01); *H04L 67/02* (2013.01);
(Continued)

(58) Field of Classification Search
None
See application file for complete search history.

(56) References Cited

U.S. PATENT DOCUMENTS 10,054,014 B1 * 8/2018 West .................. F01L 1/185
2009/0010426 A1 * 1/2009 Redmond ............ H04N 21/222
380/29

(Continued)

FOREIGN PATENT DOCUMENTS

CN 104 954 450 B 7/2018

OTHER PUBLICATIONS

Oct. 1, 2019 Search Report issued in French Patent Application No. 1874204.

*Primary Examiner* — Alazar Tilahun
*Assistant Examiner* — Charles N Hicks
(74) *Attorney, Agent, or Firm* — Oliff PLC

(57) ABSTRACT

A method for distributing an audiovisual content to a terminal is disclosed. The content is received by the terminal in the form of a succession of consecutive segments, each segment being distributed to the terminal following a transmission of a request by the terminal and being obtained by an application of a workflow to a portion of the content. The method executed by the terminal comprises, for each segment: obtaining a list of processing operations representing the workflow; running through the list and, for each processing operation, choosing a module in a set of modules able to execute the processing operation and adding an identifier composed of an address and a port number of a module chosen in a request; the identifier appearing first in the request corresponding to a first module for which the request is intended; for each processing operation, adding to the request information representing the portion of the content and information representing configuration parameters of the corresponding module; and transmitting the request to the first destination module in order to launch the execution of the workflow.

13 Claims, 5 Drawing Sheets

(51) Int. Cl.
  *H04L 65/80* (2022.01)
  *H04L 67/02* (2022.01)
  *H04N 21/2187* (2011.01)
  *H04N 21/233* (2011.01)
  *H04N 21/234* (2011.01)

(52) U.S. Cl.
  CPC ....... *H04N 21/2187* (2013.01); *H04N 21/233* (2013.01); *H04N 21/234* (2013.01); *H04N 21/25891* (2013.01)

(56) References Cited

U.S. PATENT DOCUMENTS

| | | | |
|---|---|---|---|
| 2010/0011012 A1* | 1/2010 | Rawson | H04L 67/30 707/E17.009 |
| 2010/0091835 A1 | 4/2010 | Morris | |
| 2017/0054800 A1* | 2/2017 | DiVincenzo | H04L 67/1008 |
| 2017/0272783 A1* | 9/2017 | Bachmutsky | H04N 21/2665 |
| 2018/0192097 A1* | 7/2018 | Loheide | H04N 21/25891 |

* cited by examiner

METHOD AND SYSTEM FOR DISTRIBUTING AN AUDIOVISUAL CONTENT

TECHNICAL FIELD

The present invention relates to a method for distributing an audiovisual content stored or produced by a source to a display terminal, and a system and devices implementing said method.

PRIOR ART

The world of television distribution is fundamentally changing. Whereas for a long time users were content with live broadcasting of audiovisual programmes on their television set, methods for consuming audiovisual programmes have fundamentally changed. Thus a user now wishes to be able to watch an audiovisual programme that he has chosen anywhere and at any time. These new consumption methods have been made possible by the appearance of new ever more powerful roaming terminals and by a great increase in network infrastructures.

In parallel with this change, a new audiovisual broadcasting service, referred to as OTT (Over-The-Top) has appeared. An OTT service is a service for distributing audiovisual contents over a network in which the operator of said network (i.e. a cable, telephone or satellite company) provides only a role of transporting said contents. In an OTT service, the operator of the network has no control over the contents, that is to say he is neither responsible for nor in a position to control the display of said contents, compliance with copyright, and/or redistribution of said contents. OTT services are operated on so-called non-managed networks, that is to say with a bandwidth and quality of service (QoS) that are not guaranteed.

In order to address these new services, various protocols have been developed: Apple HLS (HTTP (Hypertext Transfer Protocol) Live Streaming), Microsoft Smooth Streaming (MSS), Adobe HTTP Dynamic Streaming (HDS), and MPEG Dynamic Adaptive Streaming over HTTP (MPEG-DASH). All these protocols are based on an adaptive transmission concept based on HTTP Adaptive Streaming (HAS). The HAS concept is based on the following functioning:

Each content is encoded in the form of a bitstream according to a plurality of profiles, using various codecs, various resolutions and various bitrates. This plurality of profiles makes it possible to address terminals (or applications functioning on terminals) that have different capacities (supported codecs, screen resolution, decoding power) and to adapt the contents to the variations in bandwidth on the network.

Each bitstream is then divided into segments, referred to as chunks, of a few seconds in accordance with a format dependent on the protocol to be supported. For each content, a file, called a manifest, indicating the characteristics of each profile and the corresponding segments, is created. When a plurality of protocols have to be supported, a version of each segment is created for each protocol.

The manifests and the corresponding segments are stored on servers forming content delivery networks (CDNs), simply referred to as CDNs hereinafter. The CDNs provide cache capacities in the network, which makes it possible to improve the QoS, in particular in terms of access time and latency.

A terminal wishing to play a content sends requests to a CDN. Each request asks for a segment and specifies the profile of the segment asked for. It is therefore the terminal that determines the profile asked for.

A content may therefore be stored in a large number of versions according to the number of profiles and protocols that have to be supported. A system of the HAS type is therefore very greedy in terms of volume of data to be stored.

FIG. 1 depicts schematically an example of a channel 1 broadcasting audiovisual programmes.

The broadcasting channel 1 comprises a source 100, a block referred to as the OTT headend 10, a server, referred to as the original server, 111, and a plurality of CDNs 112A, 112B, 112C and 112D connected to terminals 114A, 114B by means of the internet 113.

The source 100 supplies an original content to the OTT headend 10. In the example in FIG. 1, this content is encoded in the form of a bitstream comprising a video substream, at least one audio substream and at least one subtitle substream.

The OTT headend 10 is responsible for preparing the content in versions in accordance with requirements of terminals that might request this content. The OTT headend 10 comprises a plurality of modules, each module being able to be a physical module (hardware) or software module. These modules may be co-located in a single system or disseminated in separate systems connected together by a communication network. In the OTT headend 10, the bitstream is received by a video decoder 101 (and respectively an audio decoder 102 and a subtitle decoder 103) that generates a decoded video stream (and respectively at least one decoded audio stream and at least one decoded subtitle stream).

The decoded video stream is supplied to two image-processing modules 104A and 104B that generate processed video streams. The image-processing module 104A is for example a noise-reducing filtering module. The image-processing module 104B is for example a contour-enhancing module.

Each processed video stream is supplied to two video encoders 107A and 107B. The video encoder 107A is for example an encoder in accordance with the AVC standard (H264/AVC (ISO/IEC 14496-10—MPEG-4 Part 10, Advanced Video Coding)/ITU-T H.264). The encoder 107B is for example an encoder in accordance with the HEVC standard (ISO/IEC 23008-2—MPEG-H Part 2, High Efficiency Video Coding)/ITU-T H.265).

Each decoded audio stream is supplied to two audio-processing modules 105A and 105B that generate processed audio streams. The audio-processing module 105A is for example a noise-reducing filtering module. The image-processing module 105B is for example a voice enhancement module.

Each processed audio stream is supplied to two audio encoders 108A and 108B. The audio encoder 108A is for example an encoder in accordance with the AAC standard (Advanced Audio Coding, ISO/IEC 13818-7). The encoder 107B is for example an encoder in accordance with the MP3 standard (MPEG-1/2 Audio Layer 3).

Each decoded subtitle stream is supplied to a subtitle-processing module 106 that generates processed subtitle streams. The subtitle-processing module 106 is for example a filtering module replacing some words by others according to regional linguistic uses.

Each processed subtitle stream is supplied to a subtitle-format conversion module.

Each video stream coming from the video encoders 107A and 107B, each audio stream coming from the audio encoders 108A and 108B and each subtitle stream coming from the conversion module 109 are transmitted to a packetiser module 110. The packetiser module 110 forms segments in accordance with the protocol or protocols to be supported. Each segment is next transmitted to an original server 111, which is responsible for transmitting these segments to the CDN 112A, 112B, 112C and 112D. Each terminal 114A (or 114B) wishing to play the content requests the content from a CDN segment by segment, changing the profile if necessary from one segment to another.

In the example in FIG. 1, from a content, the OTT headend 10 has generated, assuming that two protocols of the HAS type must be supported, around thirty different versions of the content. The segments corresponding to each version are stored on each CDN.

A concept competing with the HAS concept, known as JIT (just in time), makes it possible to reduce the number of versions to be stored. An application of the JIT concept to the OTT headend 10 would consist of not routinely using all the modules in said block. For example, the OTT headend 10 could stop at the decodings, that is to say at the video decoding by the video coder 101, at the audio decoding by the audio decoder 102 and at the subtitle decoding by the subtitle decoder 103. Next, on request, according to the requirements of the terminal that sent the request, the OTT headend 10 activates certain modules.

The JIT concept may relate to various stages in an audiovisual distribution chain. For example, the JIT concept may be applied to a processing stage (image processing, audio processing, subtitle processing) and/or to an encoding stage (video or audio) and/or to a packetising stage. Thus, for example, a packetising stage may form only segments in accordance with a single protocol. Another application of the JIT concept consists of managing a single version of a content (a single video or audio processing, a single video encoding, a single audio encoding, a single protocol) referred to as the pivot version, and then generating other versions on request from the pivot version, for example by transcoding.

One important limitation to the HAS and JIT concepts is that they involve audiovisual data broadcasting systems, known as HAS-type systems or JIT-type systems, that are static. Thus, whatever the content and whatever the moment, in order to generate a version of a content with particular characteristics, for example with given audio and video processing operations, given audio and video encodings or a given protocol, the same modules of the OTT headend are systematically instanced and the same predefined processing chain ("workflow") is systematically applied. Each module is thus connected statically with the module that gives it the data and the module to which it gives data.

The static aspect is problematic. The workflows are rigid. For example, during a live broadcast, when it is wished to improve a broadcast quality by adding a processing module in a workflow during operation or when, following the detection of an unauthorised use of the broadcast data, it is wished to add an encrypting or digital watermarking module to the workflow. In both cases, at best an intervention on the OTT headend in order to reconfigure it and at worst a replacement of the OTT headend is necessary. Moreover, the processing resources are fixed and non-extensible. It is not possible to go beyond a maximum predefined processing capacity.

It is desirable to overcome these drawbacks of the prior art. It is in particular desirable to propose a solution for achieving audiovisual data broadcasting systems that can easily be enhanced both in terms of adding new processing operations in a workflow and in terms of increase in processing resources.

DISCLOSURE OF THE INVENTION

One object of the present invention is to propose a method for distributing an audiovisual content stored or produced live by a source to a display terminal in an audiovisual distribution system, said content being received by the terminal in the form of a succession of consecutive files, referred to as segments, each segment being distributed to the terminal following a transmission of a request by said terminal and being obtained by an application of a workflow to a portion of said content. The method comprises a procedure for launching the workflow executed by the terminal or by an intermediate device situated between the terminal and the workflow comprising, for each segment: obtaining a list of at least one processing operation representing the workflow to be applied to a portion of the content in order to obtain said segment, the workflow being defined from a profile selected in a manifest comprising a set of profiles according in particular to transmission and processing constraints obtained by said terminal or the intermediate device; running through the list and, for each processing operation, choosing a module in a set of modules able to execute said processing operation and adding an identifier composed of an address and a port number of the module chosen in a request; the identifier appearing first in the request corresponding to a first module for which said request is intended; for each processing operation, adding to the request information representing the portion of the content and information representing configuration parameters of the corresponding module, the configuration parameters having been obtained from in particular the profile; and transmitting said request to the first destination module in order to launch the execution of the workflow.

The method therefore makes it possible to define a different workflow for each segment.

According to one embodiment, the workflow is defined for each segment also from commands supplied by a user or automatically by equipment measuring performances of the audiovisual distribution system.

Thus processing operations in the workflow may be omitted or replaced and new processing operations added to each segment.

According to one embodiment, each module for which said request is intended deletes its identifier of said request and retransmits the request to a new destination module in said workflow corresponding to the identifier appearing first in the request thus modified if, following said deletion, at least one identifier remains in said request, each module processing data corresponding to the portion of the content to be processed by the workflow as soon as these data are made available by the source or by a preceding module in the workflow.

The workflow is therefore not static since it is constructed gradually from the request.

According to one embodiment, the first module for which the request is intended is the first module in the workflow in the order of application of the processing operations of the workflow, each module retransmitting the request to the module following it in the workflow, said request containing the data to be processed by the module following it in the workflow.

According to one embodiment, the first module for which the request is intended is the last module in the workflow in the order of application of the processing operations of the workflow, each module retransmitting the request to the module preceding it in the workflow, each response to a request received by a module containing the data to be processed by said module supplied by the module preceding it in the workflow.

According to one embodiment, prior to the transmission of the request to the module preceding it in the workflow, the current module checks whether it possesses the data that it must process or the data that it must transmit to the module following it in the workflow or to the terminal, the possession of said data by the current module cancelling the transmission of the request.

According to one embodiment, when a request is received, each module checks that an identifier concerning it appears first in said request before any other processing operation and initiates an error procedure in the case of absence of the identifier.

According to one embodiment, when a request is received, each module recovers the information representing the configuration parameters concerning it in the request.

In one embodiment, when the procedure for launching the workflow is executed by an intermediate device, the intermediate device receives a first request in accordance with an audiovisual content broadcasting protocol and executes the procedure of launching the workflow from information representing the portion of the content and information representing the profile contained in the first request.

According to one embodiment, when the first module for which the request is intended is the last module in the workflow in the order of application of the processing operations of the workflow, each request is a request in accordance with the GET method of the GTTP or HTTPS protocol and, when the first module for which the request is intended is the first module in the workflow in the order of application of the processing operations of the workflow, each request is a request in accordance with the POST method of the HTTP or HTTPS protocol.

According to a second aspect of the invention, the invention relates to a device in an audiovisual content distribution system stored or produced live by a source to a display terminal, said content being received by said terminal in the form of a succession of consecutive files, referred to as segments, each segment being distributed to the terminal following a transmission of a request by said terminal and being obtained by an application of a workflow to a portion of said content. The device comprises means for executing a procedure of launching the workflow comprising, for each segment: obtaining means for obtaining a list of at least one processing operation representing the workflow to be applied to a portion of the content in order to obtain said segment, the workflow having been defined from a profile selected in a manifest comprising a set of profiles according in particular to transmission and processing constraints obtained by said device; running-through means for running through the list and choosing means for choosing, for each processing operation, a module in a set of modules able to execute said processing operation, and adding means for adding an identifier composed of an address and a port number of the module chosen in a request; the identifier appearing first in the request corresponding to a first module for which said request is intended; adding means for adding to the request, for each processing operation, information representing the portion of the content and information representing configuration parameters of the corresponding module, the configuration parameters having been obtained from in particular the profile; and transmission means for transmitting said request to the first destination module in order to launch the execution of the workflow.

According to a third aspect of the invention, the invention relates to a system for distributing an audiovisual content stored or produced live by a source to a display terminal, said content being received by said terminal in the form of a succession of consecutive files, referred to as segments, each segment being distributed to the terminal following a transmission of a request by said terminal and being obtained by an application of a workflow comprising at least one processing operation to a portion of said content. The system comprises a device according to the second aspect and the system comprises, for each processing operation in the workflow, a set of modules able to execute said processing operation that may be chosen by said terminal, each module comprising:

means for receiving a request transmitted by said terminal or another module in the workflow, means for deleting its identifier from said request;

means for retransmitting said request to another module in said workflow corresponding to the identifier appearing first in the request if, following said deletion, at least one identifier remains in said request; and data processing means corresponding to the portion of the content to be processed by the workflow as soon as these data are made available by the source or by a preceding module in the workflow.

According to a fourth aspect of the invention, the invention relates to a computer program product comprising instructions for the implementation, by a device, of the method according to the first aspect by a processor of the device.

According to a fifth aspect of the invention, the invention relates to storage means storing a computer program comprising instructions for the implementation, by a device, of the method according to the first aspect when said program is executed by a processor of said device.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DISCLOSURE OF EMBODIMENTS

Figure 1:
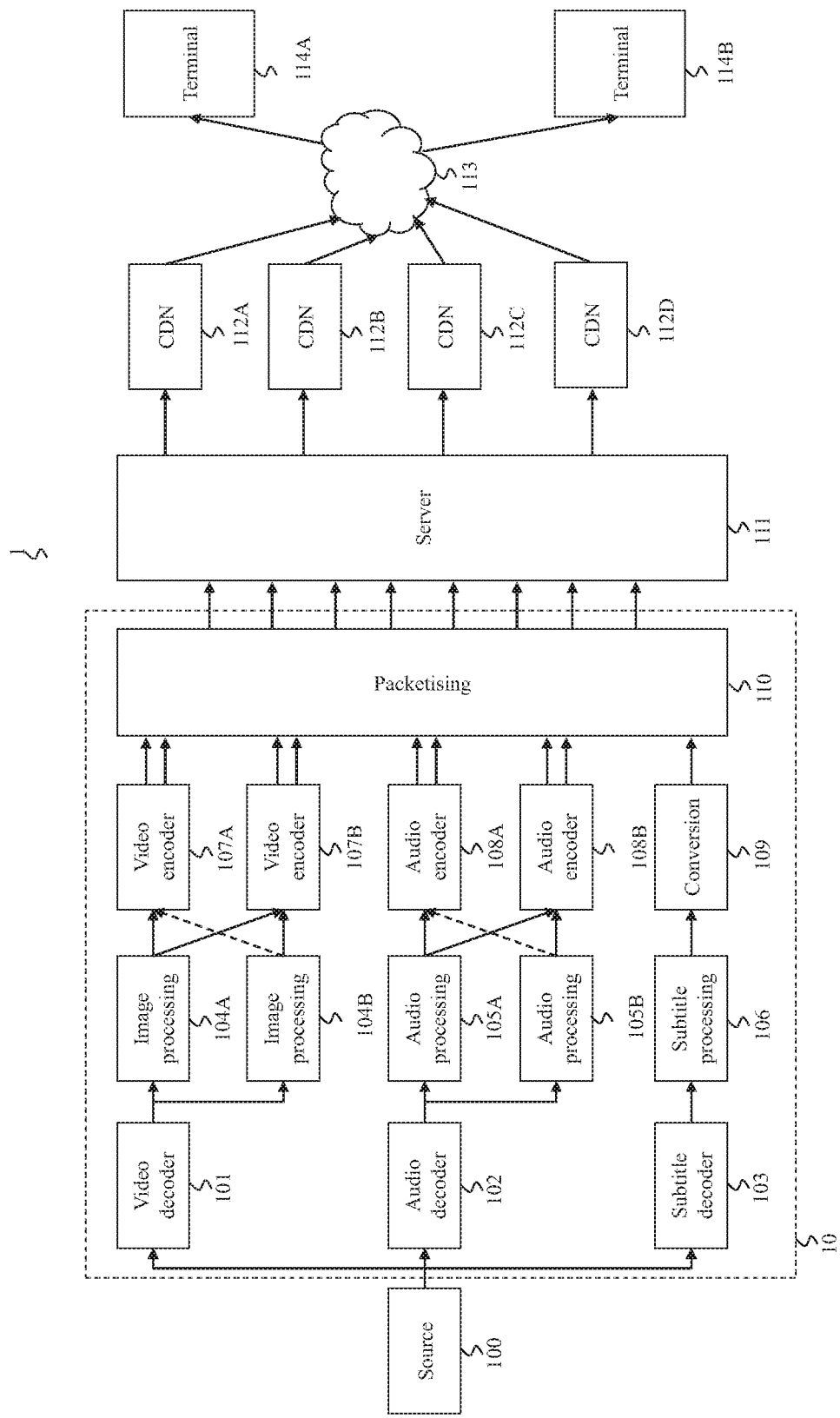
FIG. 1 describes a system for broadcasting conventional audiovisual data.
Figure 2A:
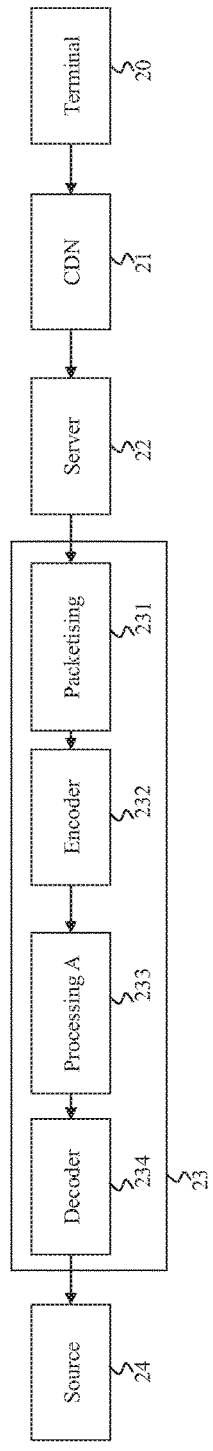
FIG. 2A describes a system for broadcasting audiovisual data at a first instant during the broadcast.
Figure 2B:
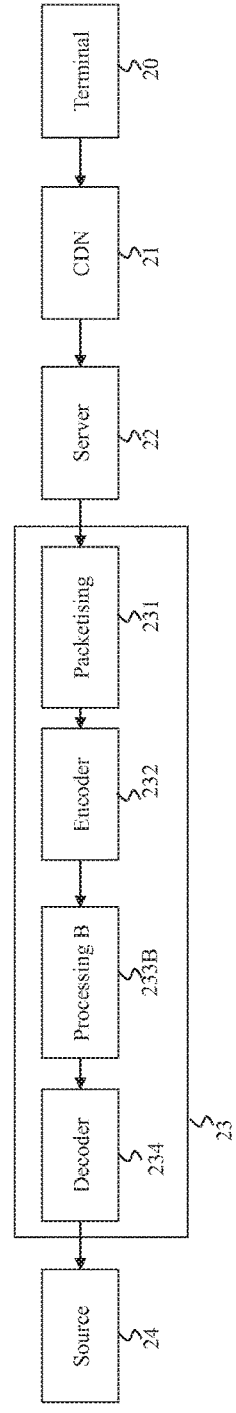
FIG. 2B describes a system for broadcasting audiovisual data at a second instant during the broadcast.
Figure 2C:
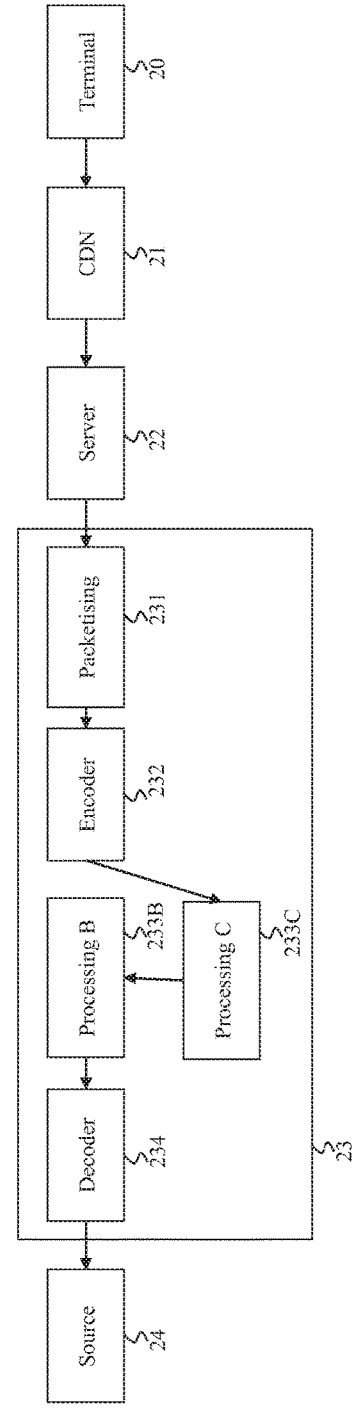
FIG. 2C describes a system for broadcasting audiovisual data at a third instant during the broadcast.

FIGS. 2A, 2B and 2C describe a development of an audiovisual data broadcasting system during operation in the case of use of the invention.

At a first instant, corresponding to FIG. 2A, this broadcasting system comprises a display terminal 20, at least one CDN 21, an original server 22, simply referred to as server hereinafter, a workflow 23 and a source 24. The source 24 comprises at least one audiovisual content, simply referred to as content hereinafter, which can be requested by the terminal 20 in accordance with a particular profile. The workflow 23 comprises a decoding module 234 able to execute an audio and video decoding, an image-processing module 233 able to apply a processing operation A, an encoding module 232 able to effect an audio and video encoding, and a packetising module able to generate segments in accordance with a predetermined protocol. The processing operation A is for example a noise-reducing filtering. Each module in the workflow 23 may be a software module executed by a computing unit or a hardware module. The processing modules in the workflow 23 may be co-located geographically and connected for example by a communication bus or dispersed and connected together by a communication network.

In the example in FIG. 2A, the distribution chain is in the process of distributing a content. The terminal 20 has fixed a profile and the distribution chain supplies segments compatible with this profile. As seen above, for each segment of the content, the terminal 20 sends a request in the direction of the workflow containing information representing the required profile.

As is described hereinafter, the workflow 23 is defined dynamically for each segment by the terminal 20 or by an intermediate device that may be the CDN 21 or the server 22. For each segment, each processing module has been chosen from a set of candidate processing modules able to apply exactly the same processing. Thus, although from one segment to another the workflow 23 can apply strictly identical processing operations, each processing operation may be executed by different processing modules. For a given processing operation, a change in processing module may be motivated by a temporary non-availability of a processing module, for example when this processing module is already being used for generating another segment, by a malfunctioning of said processing module, by an overload of the computing unit that is to implement said processing module, by a choice of an operator who wishes to favour certain computing units rather than others, etc.

At a second instant depicted in FIG. 2B, still during the broadcasting of the content, an operator has for example realised that a quality of the content displayed on the terminal 20 was not sufficient. In this context, a processing operation B would be more appropriate than a processing operation A. The processing operation B is for example a filtering for enhancing the contours. In this case, the operator sends for example a command to the terminal 20 so that the terminal 20 generates a request for modifying the workflow 23. Following this command, the processing module 233 is replaced by a processing module 233B implementing the processing operation B.

At a third instant, depicted in FIG. 2C, still during the broadcasting of the content, the operator has for example realised that the content is being broadcast fraudulently on unauthorised terminals. In this context, in order to stop this fraud, a processing operation C of the digital watermarking type is appropriate. In this case, the operator sends for example a command to the terminal 20 so that the terminal 20 generates a request for modifying the workflow 23. Following this parameterising by the operator, a processing module 233C implementing the processing operation C is added to the workflow 23 between the processing module 233B and the encoding module 232.

The examples described in FIGS. 2A, 2B and 2C show that the invention affords great dynamicity in the definition of the workflow. Thus a different workflow can be defined at each segment. It should be noted that the definition of the workflow is not only dynamic in the choice of the candidate processing module that is to implement such and such a processing operation, but also in terms of choice of processing operations to be applied by this workflow.

Each entity making up the broadcasting system depicted in FIGS. 2A, 2B and 2C (i.e. the terminal 20, the CDN 21, the server 22, the modules 231, 232, 233, 234, 233B, 233C and the source 24) or each computing entity implementing one of these entities, comprises a module, referred to as a system module, responsible for partly implementing the invention.

Figure 3:
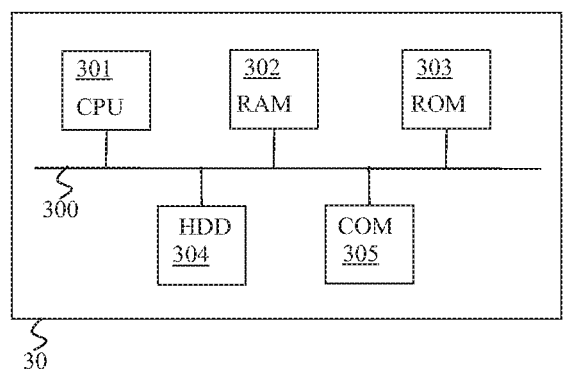
FIG. 3 illustrates an example of hardware architecture of a system module used in the context of the invention.

FIG. 3 illustrates an example of hardware architecture of a system module 30 used in the context of the invention.

The system module 30 then comprises, connected by a communication bus 300: a processor or CPU 301; a random access memory RAM 302; a read only memory ROM 303; a storage unit or a storage medium reader, such as an SD card reader 304; a set of communication interfaces 305 enabling the system module 30 to communicate with other entities in the broadcasting system. In one embodiment, the communication interface 305 implements in particular a web server able to receive and generate HTTP or HTTPS (HTTP Secure) requests.

The processor 301 is capable of executing instructions loaded in the RAM 302 from the ROM 303, from an external memory (not shown), from a storage medium such as an SD card, or from a communication network. When the entity (i.e. the terminal 20, the CDN 21, the server 22, the processing modules 231, 232, 233, 234, 233B, 233C or the source 24) is powered up, the processor 301 is capable of reading instructions from the RAM 302 and executing them. These instructions form a computer program causing the implementation, by the processor 301, of a method described in relation to FIGS. 4 and 5.

Figure 4:
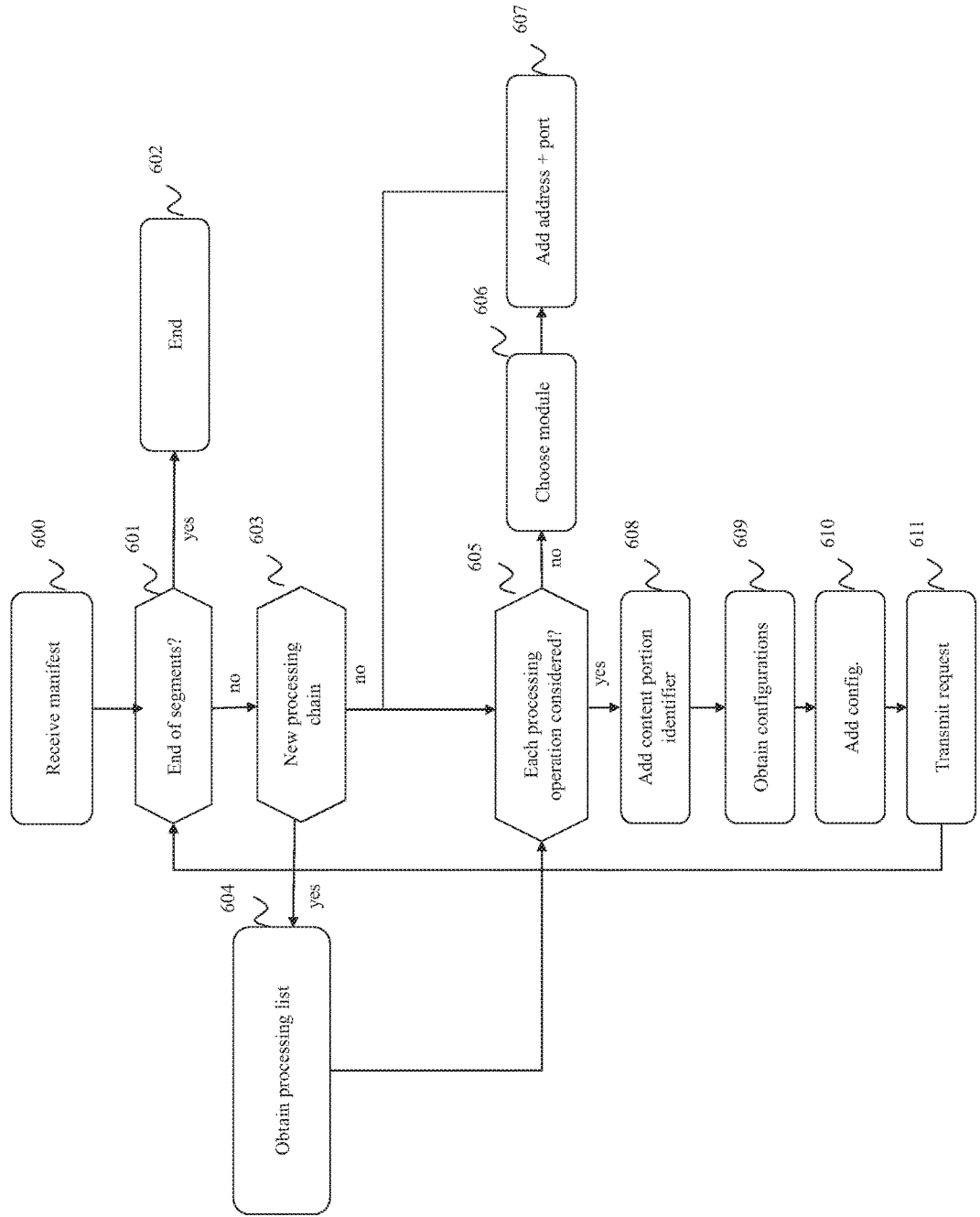
FIG. 4 illustrates schematically steps of a method according to the invention executed by a terminal or an intermediate device between a workflow and a terminal.
Figure 5:
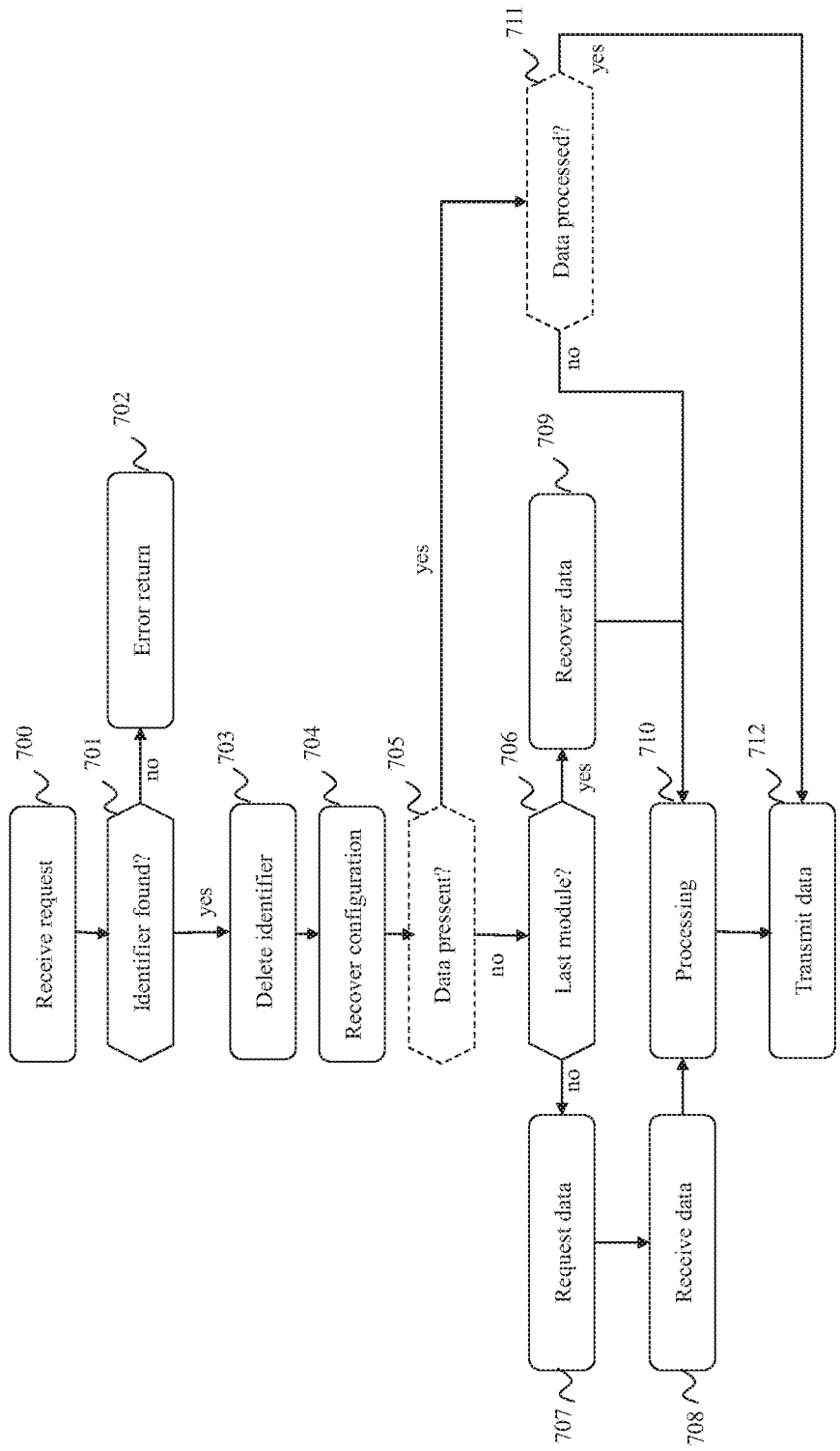
FIG. 5 illustrates schematically steps of a method according to the invention executed by a module in a workflow.

All or part of the method described in relation to FIGS. 4 and 5 can be implemented in software form by the execution of a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit).

Hereinafter, we describe a method for distributing a content stored or produced live by the source 24 to the terminal 20. This distribution requires exchanges of requests and data between the various entities constituting the distribution system. In one embodiment, these exchanges use requests in accordance with the HTTP protocol or the HTTPS protocol. Other protocols suitable for this type of exchange could however be envisaged.

FIG. 4 illustrates schematically steps of a method according to the invention executed by a terminal or an intermediate device between the workflow and the terminal.

According to one embodiment, the method in FIG. 4 is executed by the system module 30 of the terminal 20. Hereinafter, in order to simplify, we shall state simply that the method in FIG. 4 is executed by the system module 30.

Prior to the implementation of the method in FIG. 4, we assume that the system module 30 has requested a manifest from the CDN 20 concerning a content. In a step 600, the system module 30 receives a request containing the manifest coming from the CDN 20. This manifest describes each profile that can be requested by the system module 30.

In a step 601, the system module 30 determines whether it must continue to play the current content or not, i.e. whether it must request a new segment, referred to as the current segment. This information has for example been supplied by a user of the terminal 20. If the system module 30 must not continue to play the content, the method ends in a step 602.

Otherwise step 601 is followed by a step 603. During step 603, the system module 30 determines whether the workflow 23 used for the segment preceding the current segment must be modified. In other words, is it necessary to add, eliminate or replace a processing operation executed by the workflow 23 in order to obtain the current segment. In one embodiment, whenever there is a change of profile, the system module 30 considers that the workflow 23 must be modified. In step 603, the system module 30 selects a profile, referred to as the current profile, among the profiles of the manifest according to transmission and processing constraints obtained by the system module 30. The transmission constraints are for example a bitrate constraint measured by the system module 30. The processing constraints are for example a display capacity (i.e. a screen resolution) of the terminal 20, a number of images that can be decoded per second, etc. Once determined, the current profile is compared with the profile requested for the segment preceding the current segment. If the two profiles are identical, the system module 30 executes a step 605. If the two profiles are different or if the current segment is the first segment requested for the content, the system module 30 executes a step 604.

In step 604, the system module 30 obtains a list of at least one processing operation representing the workflow 30 to be applied to a portion of the content in order to obtain the current segment. In this embodiment, this list is deduced from the profile selected in step 603. The system module 30 has for example a lookup table associating each profile that can be requested for a content, with a list of processing operations.

Step 604 is followed by step 605. In step 605, the system module 30 uses either the list of processing operations defined in step 604 or the list of processing operations corresponding to the workflow applied to the segment preceding the current segment. In one embodiment, the list of processing operations used in step 605 is an ordered list in which the processing operations to be applied to the portion of the content in order to obtain the current segment appear in the reverse order in which these processing operations must be applied. For example, if the example of FIG. 2A is taken, the processing list is as follows:
1. packetising;
2. encoding;
3. processing A;
4. decoding.

In step 605, the system module 30 determines whether each processing operation in the list of processing operations has been considered. If not, the system module 30 runs through the list from the first processing operation seeking the next processing operation not yet considered.

In a step 606, the system module 30 chooses a processing module (software or hardware) in a set of processing modules able to execute said processing operation.

In a step 607, the system module 30 adds an identifier composed of an address and a port number of the processing module chosen in the request. The request is an HTTP or HTTPS request. Each identifier is written following any identifier or identifiers already present in the request.

Step 607 is followed by step 605, during which the system module 30 passes to the following processing operation in the list.

When all the processing operations in the list have been considered, the system module 30 passes to a step 608. In step 608, the system module 30 adds to the request information representing the portion of the content in the request.

In a step 609, the system module 30 obtains, for each processing operation, information representing configuration parameters of the processing module corresponding to said processing operation, the configuration parameters having been obtained from in particular the profile selected in step 603.

In a step 610, the system module adds the information representing configuration parameters of each processing module in the request.

Assuming that the workflow to be applied to the current segment is the workflow 23 in FIG. 2A, the request comprises the following sequence:

http://Address1:port1/Address2:port2/Address3:port3/Address4:port4/IDportion?Conf where Address1:port1 (and respectively Address2:port2, Address3:port3, Address4:port4) corresponds to the identifier (the address and the port number) of the processing module 231 (and respectively the identifier of the processing module 232, of the processing module 233 and of the processing module 234). IDportion corresponds to the information representing the portion of the content in the request. Conf corresponds to the information representing configuration parameters of each processing module.

In one embodiment, the information Conf takes the following form:

Conf1=NameConf1&Conf2=NameConf2&Conf3=NameConf3&Conf4=NameConf4 where ConfN corresponds to an identifier of the configuration of a module N and NameConfN corresponds to a name of the text file, for example to the JSON (JavaScript Object Notation) or XML (Extensible Markup Language) format containing the configuration in detail that it is necessary to apply. These text files are for example known to each processing module.

In another embodiment, the information Conf takes the following form:

Conf1Param1=c1v1&Conf1Param2=c1v2&Conf1Param3=c1v3& . . . &
Conf2Param1=c2v1&Conf2Param2=c2v2&Conf2Param3=c2v3& . . . &
Conf3Param1=c3v1&Conf3Param2=c3v2&Conf3Param3=c3v3& . . . &
Conf4Param1=c4v1&Conf4Param2=c4v2&Conf4Param3=c4v3 where ConfNParamM corresponds to an identifier of the Mth parameter of the configuration of the processing module N and cNvM corresponds to a value of the Mth parameter of the configuration of the processing module N. Here the configuration is supplied in detail directly in the request.

It should be stated however that, in the case of HTTP/HTTPS, there is a size constraint of 1024 characters per request. In order to get round this, it is possible to imagine for example a single parameter Conf=ConfName where ConfName represents a pointer to a configuration the detailed parameters of which are stored for example in a database shared by the processing modules.

In a step 611, the system module 30 transmits the request to the first destination processing module in order to initiate the execution of the workflow and thus to cause the transmission of the current segment to the terminal 20.

It should be noted that the broadcasting systems described in relation to FIGS. 2A, 2B and 2C comprise a CDN 21 and a server 22 situated between the terminal and the workflow 23. In this case, the request sent by the terminal 20 passes through the server 21 and the CDN 22 without any action by these, which merely retransmit it.

It should be noted that the method described in relation to FIG. 4 forms a procedure for launching the workflow.

Up until now, we have considered that the procedure for launching the workflow was executed by the system module 30 of the terminal 20.

In some cases, the system module 30 of the terminal 20 is not capable of generating requests according to the invention but only requests, referred to as conventional requests, in accordance with more conventional protocols such as requests in accordance with the HLS or MPEG-DASH protocols. In this case, the request according to the invention must be generated by an intermediate device between the terminal 20 and the workflow. This intermediate device must then receive each conventional request sent by the terminal 20 and form, from the conventional request, the request according to the invention. To do this, at each reception of a conventional request by the intermediate device, the intermediate device recovers information representing the profile requested in the conventional request and information representing the content portion requested in the conventional request. From this information, the intermediate device applies the procedure for launching the workflow. In step 601, the intermediate device considers routinely that a new segment must be requested. In step 603, the current profile is the profile found in the conventional request. The intermediate device then fulfils a role of request translator.

In one embodiment, the intermediate device is a CDN, for example the CDN 21.

In one embodiment, the intermediate device is the server 22.

In one embodiment, the intermediate device is a web-server module situated between the server 22 and the workflow 23.

In one embodiment, the workflow is defined according to the profile selected in step 603 but also according to commands received by the terminal 20 or the intermediate device. These commands are for example commands provided by an operator of the distribution system. These commands indicate that the workflow must comprise one or more given modules (for example a digital watermarking module). These commands may also be provided automatically by equipment measuring performances of the broadcasting system. For example, the equipment may measure a quality of a broadcast or of a plurality of broadcasts, a latency of a broadcast or of a plurality of broadcasts, a load on the devices or on the computing units using each processing module of a workflow or of a plurality of workflows. For example, if computing units using processing modules of a plurality of workflows are overloaded, the equipment may decide to modify the workflows in order to pass to processing modules executing processing operations that are less expensive in terms of computing costs.

In one embodiment, the system module 30 of the terminal 20 or of the intermediate device does not have a lookup table but receives, from the CDN 20, a manifest comprising, for each possible profile, an ordered processing list to be applied in order to obtain a segment in accordance with this profile.

FIG. 5 illustrates schematically steps of a method according to the invention executed by each module of a workflow.

As seen above, the request obtained by the procedure for launching the workflow was transmitted to the processing module of the workflow the identifier of which appears first in the request. In the embodiment described in relation to FIG. 4, the processing module appearing first in the request is the processing module 231 corresponding to the last processing operation to be applied to the content portion in order to obtain the current segment.

In a step 700, the system module 30 of the processing module 231 receives the request.

In a step 701, the system module 30 of the processing module 231 checks that the identifier of the processing module 231 is indeed present in said request. If the identifier is not present, in a step 702 the system module 30 of the processing module 231 launches an error procedure. The error procedure consists for example in sending an error message to the device that executed the procedure for launching the workflow (i.e. the terminal 20, the CDN 21 or the server 22).

If the identifier of the processing module 231 is present in the request, the system module 30 of the processing module 231 deletes its identifier from the request in a step 703.

In a step 704, the system module 30 of the processing module 231 extracts the information representing its configuration parameters of the request.

In a step 706, the system module 30 of the processing module 231 checks whether it is the first module in the workflow. To do this, for example, the system module 30 of the processing module 231 checks whether, following the deletion of its identifier, at least one identifier remains in the request.

In this case, following the deletion of the identifier of the processing module 231, the identifiers of the processing modules 232, 233 and 234 remain in the request. In this case, in a step 707, the system module 30 of the processing module 231 transmits the request thus modified to the processing module the identifier of which now appears first in the request, that is to say the processing module 232.

In a step 708, following the transmission of the request during step 707, the system module 30 of the processing module 231 receives data coming from the processing operation or operations executed by the processing module or modules preceding the processing module 231.

In a step 710, the system module 30 launches the processing by the processing module 231 of the data received in step 708.

In a step 712, the module 30 of the processing module 231 sends the processed data to the terminal 20. The data processed by the processing module 231 correspond to the current segment.

The request generated during the procedure of launching the workflow is thus transmitted gradually to each module in the workflow 23. All the modules in the workflow execute the same steps of the method in FIG. 5 except for the first processing module in the workflow in the order of application of the processing operations (i.e. the processing module 234).

When the system module 30 of the processing module 234 executes the method in FIG. 5, step 706 is followed by step 709. During step 709, the system module 30 of the processing module 234 transmits to the source a request to obtain the portion of the content to be processed by the workflow 23 and receives said portion. Step 709 is followed by step 710.

Taking once again the example of the workflow 23 in FIG. 2A, the processing module 231 receives the request issuing from the procedure of launching the workflow, this request comprising the following sequence:

http://Address1:port1/Address2:port2/Address3:port3/Address4:port4/IDportion?Conf The processing module 232 receives the request modified by the module 231, this request comprising the following sequence:

http://Address2:port2/Address3:port3/Address4:port4/IDportion?Conf

The processing module 233 receives the request modified by the modules 231 and 232, this request comprising the following sequence:

http://Address3:port3/Address4:port4/IDportion?Conf

Finally, the processing module 234 receives the request modified by the modules 231, 232 and 233, this request comprising the following sequence:

http://Address4:port4/IDportion?Conf

In one embodiment, the method described in relation to FIG. 5 comprises a step 705 during which the system module 30 of the processing module 231 (or of the processing module 232, 233 or 234) checks whether the processing module 231 already has the data that are requested of it. These data may for example have been requested of the processing module 231 through another request. If the processing module 231 does not have these data, the method continues with step 706.

If the processing module 231 has these data, the system module 30 of the processing module 231 determines, in a step 711, whether these data have already been processed. If these data are processed, the system module 30 of the processing module 231 executes step 712. Otherwise the system module 30 executes step 710.

In one embodiment, in step 704, once a processing module has recovered its configuration parameters, it deletes these configuration parameters from the request.

Note that all the requests exchanged in the example execution of the method described in relation to FIG. 5 are in accordance with the GET method of the HTTP/HTTPS protocol.

Up until now, we have considered that the module the identifier of which appears first in the request issuing from the execution of the procedure for launching the workflow was the last processing module in the workflow in the order of execution of the processing operations on the content portion used for generating the current segment. In this embodiment, the request generated by the procedure for launching the workflow runs through the processing modules of the workflow in the reverse order of the processing operations and then the data to be processed in order to obtain the segment run through the workflow in the order of the processing operations.

In one embodiment, the processing list used in step 605 is an ordered list in which the processing operations to be applied to the portion of the content for obtaining the current segment appear in the order in which these processing operations must be applied. In this embodiment, the processing module the identifier of which appears first in the request issuing from the execution of the procedure for launching the workflow is the first processing module in the workflow in the order of execution of the processing operations. If the workflow 23 in FIG. 2A is taken again, the request issuing from the execution of the procedure for launching the workflow comprises the following sequence:

http://Address4:port4/Address3:port3/Address2:port2/Address1:port1/IDportion?Conf The first processing module to receive the request is therefore the processing module 234. Following the reception of the request, the system module 30 of the processing module 234 executes the method in FIG. 5. In step 706, the system module 30 of the processing module 234 checks whether it is the first processing module in the workflow in the order of application of the processing operations. It is assumed here that, by definition, a decoding module knows that it is the first processing module in a workflow. In this case, following step 706, the system module 30 of the processing module 234 applies step 709.

In step 712, the system module 30 of the processing module 234 transmits the request modified in step 703 (and in step 704) to the following module in the workflow in the order of processing operations carried out by the workflow (i.e. the module 233). However, in this embodiment, the request comprises the data to be processed by the following processing module.

Thus, when this request is received by the system module 30 of the processing module 233 (and respectively of the processing module 232 and 231), during the test of step 705, said system module 30 routinely determines that the processing module 233 (and respectively 232 and 231) already has the data. If these data have not previously been processed, the system module 30 of the processing module 233 (and respectively of the module 232 and 231) launches the processing of the data by the processing module 233 (and respectively by the processing module 232 and 231) in step 710. Since the data may already have been processed by the processing module 233 (and respectively by the processing module 232 and 231) following a reception of a previous request, step 711 can also be followed by step 712.

The last processing module in the workflow in the order of application of the processing operations, that is to say the processing module 231, then transmits the segment in the direction of the terminal 20.

Taking the example of the processing operation 23 in FIG. 2A again, the processing module 234 therefore receives the request issuing from the procedure for launching the workflow, this request comprising the following sequence:

http://Address4:port4/Address3:port3/Address2:port2/Address1:port1/IDportion?Conf The processing module 233 receives the request modified by the module 234, this request comprising the following sequence:

http://Address3:port3/Address2:port2/Address1:port1/IDportion?Conf

The processing module 232 receives the request modified by the modules 234 and 233, this request comprising the following sequence:

http://Address2:port2/Address1:port1/IDportion?Conf

Finally, the processing module 231 receives the request modified by the modules 234, 233 and 232, this request comprising the following sequence:

http://Address1:port1/IDportion?Conf

In this embodiment, the requests exchanged are in accordance with the POST method of the HTTP/HTTPS protocol.

In one embodiment, the procedure for launching the workflow is executed by the CDN 21 independently of any request from a terminal. In this embodiment, the CDN 21 anticipates any future requests coming from clients. The segments thus obtained are at least temporarily stored by the CDN 21.

Up until now we have considered that the terminal 20 or the intermediate device requested the content segment by segment. The invention could however function identically if the terminal 20 or the intermediate device requested the content by group of segments.

The invention claimed is:

1. A method for distributing an audiovisual content stored or produced live by a source to a display terminal in an audiovisual distribution system, said content being received by the terminal in the form of a succession of consecutive files, referred to as segments, each segment being distributed to the terminal following a transmission of a request by said terminal and being obtained by an application of a workflow of at least one processing operation on a portion of audiovisual content, wherein the method comprises a procedure for launching the workflow executed by the terminal or by an intermediate device situated between the terminal and the workflow comprising, for each segment:

obtaining a list of the at least one processing operation representing the workflow to be applied to the portion of the audiovisual content in order to obtain said segment, the workflow being defined responsive to a profile selected in a manifest comprising a set of profiles according in particular to transmission and processing constraints obtained by said terminal or the intermediate device, whereby the transmission and processing constraints comprise limitations in hardware or software which limit an ability of at least one operation of a series of predefined processing operations to be properly applied to the audiovisual content;

running through the list and, for each processing operation, choosing a processing module in a set of a plurality of processing modules, each module being able to execute said processing operation and adding an identifier composed of an address and a port number of the processing module chosen in a request; the identifier appearing first in the request corresponding to a first processing module for which said request is intended;

for each processing operation, adding, to the request, (1) a content identifier identifying the portion of the content in the request that the workflow is to be applied to and (2) a configuration identifier and values of configuration parameters of the corresponding processing module, the configuration parameters having been obtained responsive to in particular the profile; and transmitting said request to a first destination processing module in order to launch the execution of the workflow.

2. The method according to claim 1, wherein the workflow is defined for each segment also from commands supplied by a user or automatically by equipment measuring performances of the audiovisual distribution system.

3. The method according to claim 1, wherein each processing module for which said request is intended deletes its identifier of said request and retransmits the request to a new destination processing module in said workflow corresponding to the identifier appearing first in the request thus modified if, following said deletion, at least one identifier remains in said request, each processing module processing data corresponding to the portion of the content to be processed by the workflow as soon as these data are made available by the source or by a preceding processing module in the workflow.

4. The method according to claim 1, wherein the first processing module for which the request is intended is the first processing module in the workflow in the order of application of the processing operations of the workflow, each processing module retransmitting the request to the processing module following it in the workflow, said request containing the data to be processed by the processing module following it in the workflow.

5. The method according to claim 1, wherein the first processing module for which the request is intended is the last processing module in the workflow in the order of application of the processing operations of the workflow, each processing module retransmitting the request to the processing module preceding it in the workflow, each response to a request received by a processing module containing the data to be processed by said processing module supplied by the processing module preceding it in the workflow.

6. The method according to claim 5, wherein, prior to the transmission of the request to the processing module preceding it in the workflow, the current processing module checks whether it possesses the data that it must process or the data that it must transmit to the processing module following it in the workflow or to the terminal, the possession of said data by the current processing module cancelling the transmission of the request.

7. The method according to claim 1, wherein, when a request is received, each processing module checks that an identifier concerning it appears first in said request before any other processing operation and initiates an error procedure in the case of absence of the identifier.

8. The method according to claim 3, wherein, when a request is received, each processing module recovers the information representing the configuration parameters concerning it in the request.

9. The method according to claim 1, wherein, when the procedure for launching the workflow is executed by an intermediate device, the intermediate device receives a first request in accordance with an audiovisual-content broadcasting protocol and executes the procedure of launching the workflow from information representing the portion of the content and information representing the profile contained in the first request.

10. The method according to claim 1, wherein, when the first processing module for which the request is intended is the last processing module in the workflow in the order of application of the processing operations of the workflow, each request is a request in accordance with the GET method of the GTTP or HTTPS protocol and, when the first processing module for which the request is intended is the first processing module in the workflow in the order of application of the processing operations of the workflow, each request is a request in accordance with the POST method of the HTTP or HTTPS protocol.

11. A device in an audiovisual content distribution system stored or produced live by a source to a display terminal, said content being received by said terminal in the form of a succession of consecutive files, referred to as segments, each segment being distributed to the terminal following a transmission of a request by said terminal and being obtained by an application of a workflow of at least one processing operation on a portion of audiovisual content, wherein the device comprises at least one processor configured to execute a procedure of launching the workflow comprising, for each segment:

obtaining a list of the at least one processing operation representing the workflow to be applied to the portion of the audiovisual content in order to obtain said segment, the workflow being defined responsive to a profile selected in a manifest comprising a set of profiles according in particular to transmission and processing constraints obtained by said terminal or the intermediate device, whereby the transmission and processing constraints comprise limitations in hardware or software which limit an ability of at least one operation of a series of predefined processing operations to be properly applied to the audiovisual content;

running through the list and choosing, for each processing operation, a processing module in a set of a plurality of processing modules, each module being able to execute said processing operation, and adding an identifier composed of an address and a port number of the processing module chosen in a request; the identifier appearing first in the request corresponding to a first processing module for which said request is intended;

adding to the request, for each processing operation, (1) a content identifier identifying the portion of the content in the request that the workflow is to be applied to and (2) a configuration identifier and values of configuration parameters of the corresponding processing module, the configuration parameters having been obtained responsive to in particular the profile; and transmitting said request to a first destination processing module in order to launch the execution of the workflow.

12. A system for distributing an audiovisual content stored or produced live by a source to a display terminal, said content being received by said terminal in the form of a succession of consecutive files, referred to as segments, each segment being distributed to the terminal following a transmission of a request by said terminal and being obtained by an application of a workflow comprising at least one processing operation to a portion of said content, wherein the system comprises a device according to claim 11 and in that the system comprises, for each processing operation in the workflow, a set of processing modules able to execute said processing operation that may be chosen by said terminal, each processing module comprising at least one processor configured to: receive a request transmitted by said terminal or another processing module in the workflow, delete its identifier from said request; retransmit said request to another processing module in said workflow corresponding to the identifier appearing first in the request if, following said deletion, at least one identifier remains in said request; and process data corresponding to the portion of the content to be processed by the workflow as soon as these data are made available by the source or by a preceding processing module in the workflow.

13. Non-transitory storage medium, wherein they store a computer program comprising instructions for the implementation, by a device, of the method according to claim 1 when said program is executed by a processor of said device.

\* \* \* \* \*